Nov. 8, 1966  P. A. MARTIN  3,283,347

TRAILER ATTACHMENT FOR BOATS

Filed June 4, 1965  4 Sheets-Sheet 1

INVENTOR:
PAUL A. MARTIN

BY

ATTORNEY

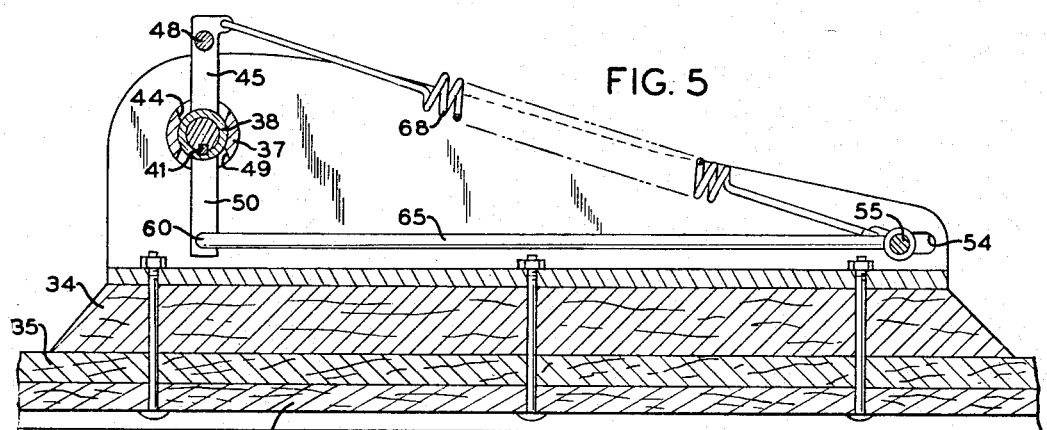
FIG. 5
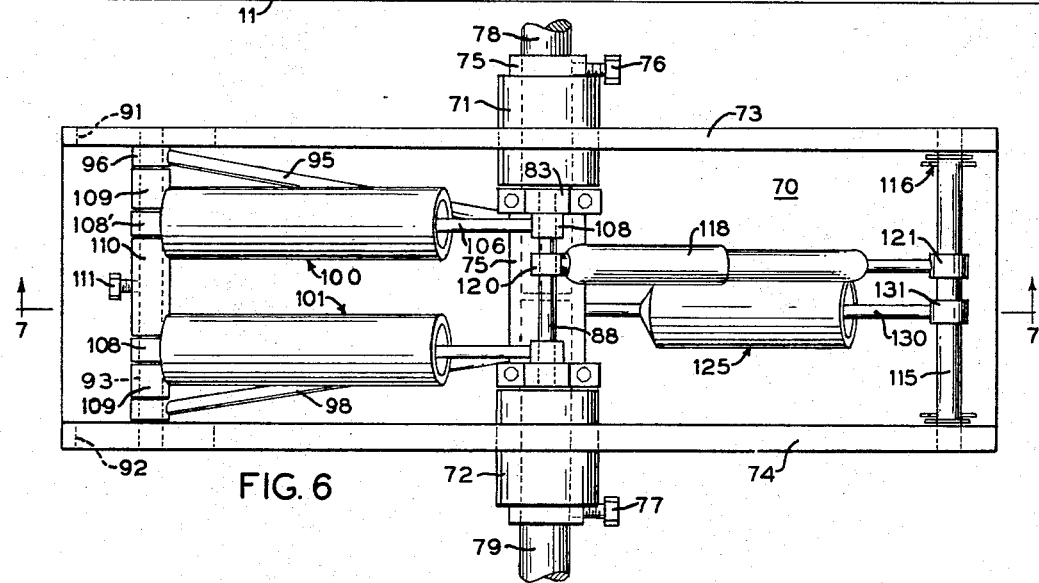
FIG. 6
FIG. 7
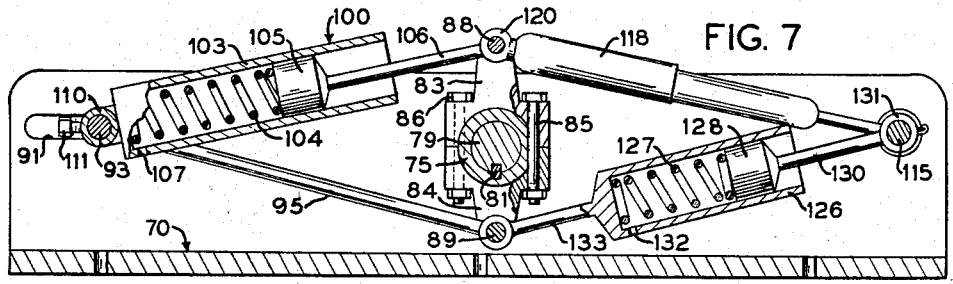
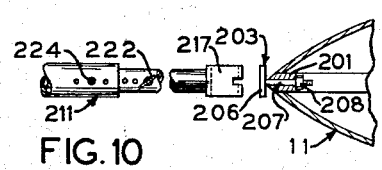
FIG. 10
INVENTOR:
PAUL A. MARTIN
BY
ATTORNEY Nov. 8, 1966  P. A. MARTIN  3,283,347
TRAILER ATTACHMENT FOR BOATS
Filed June 4, 1965  4 Sheets-Sheet 3
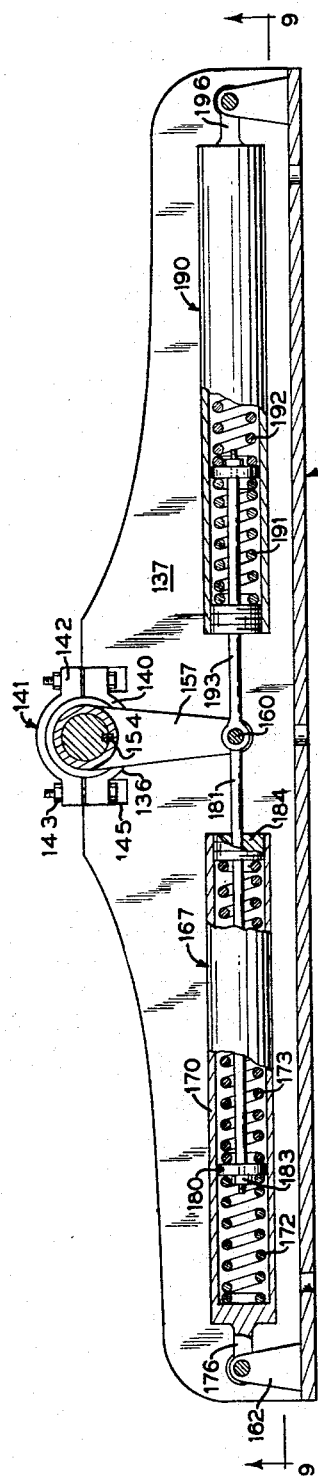
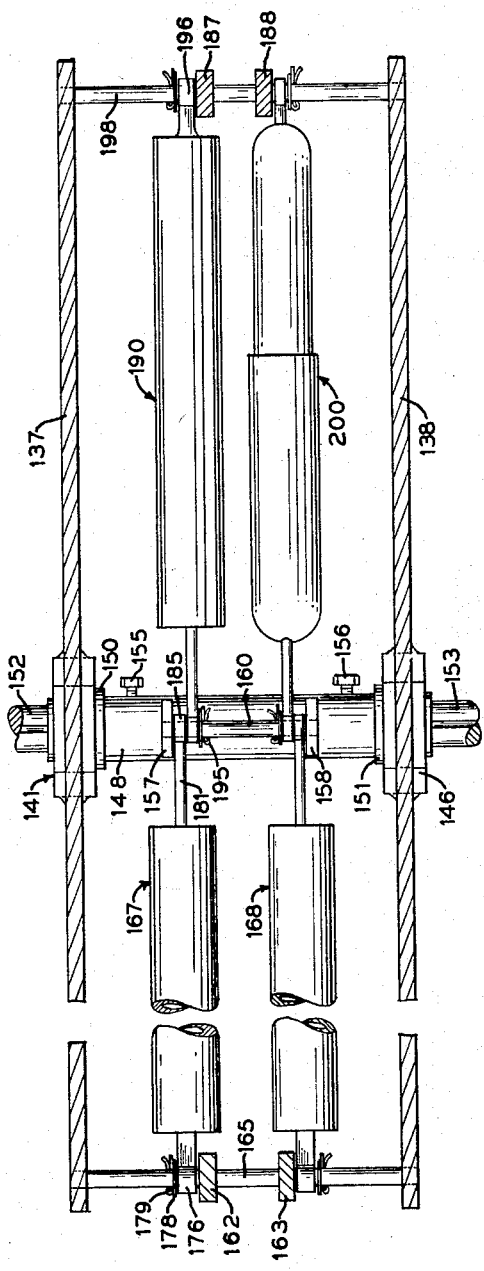
INVENTOR:
PAUL A. MARTIN
BY
ATTORNEY

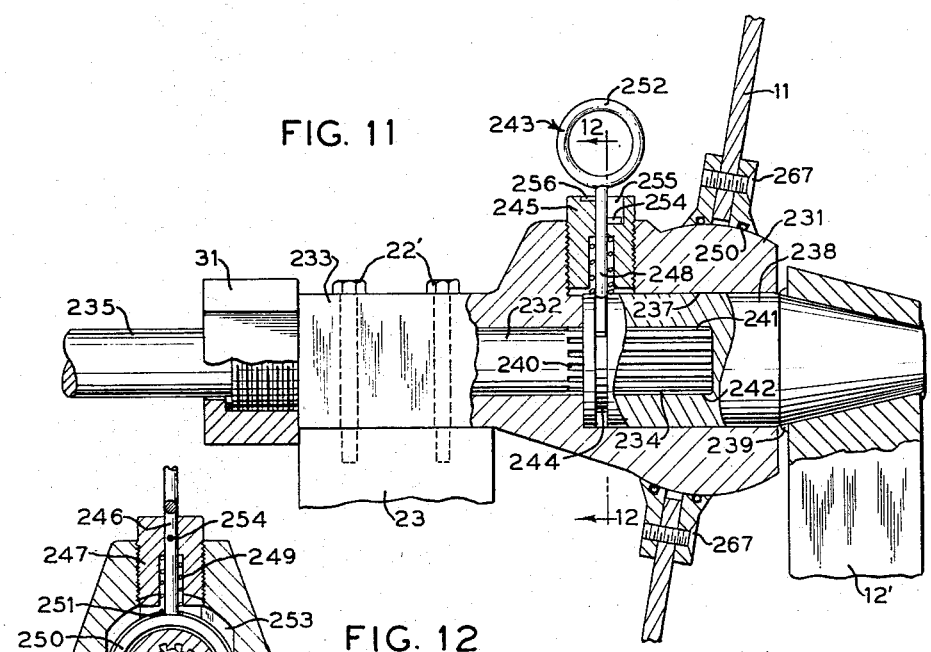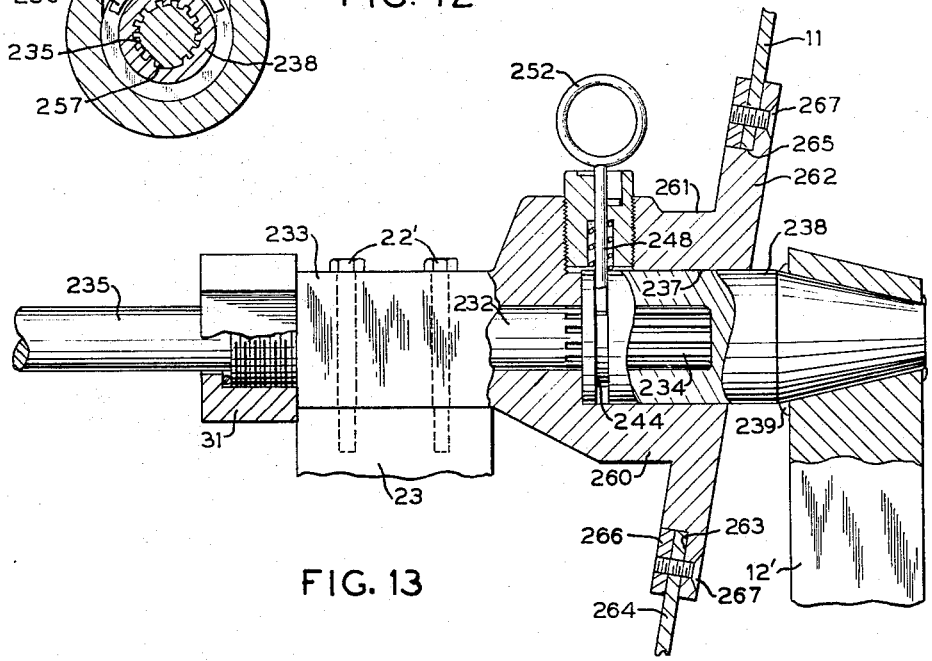

United States Patent Office 3,283,347
Patented Nov. 8, 1966

3,283,347
TRAILER ATTACHMENT FOR BOATS
Paul A. Martin, 2013 Yucca Drive, Decatur, Ga.
Filed June 4, 1965, Ser. No. 467,807
10 Claims. (Cl. 9—1)

This invention relates to a trailer attachment for boats and more particularly concerns a means which may readily be applied to the hull of a boat for conveniently permitting transportation of the same as a trailer for an automobile, and which may quickly be removed therefrom to permit the boat to function in its normal manner.

One of the objects of this invention is to provide a new and improved trailer attachment for boats in which exterior wheel support arms and a towing hitch may be readily detached or attached so as to simplify transition between road and water travel.

Another object of this invention is to provide a new and improved wheel support arrangement which combines in a single mechanism the advantages of both an independent torsional suspension and a dual spring and shock suspension.

Still another object of this invention is to provide in a trailer attachment for boats a new and improved universal hull fitting which permits adaptation of the invention to hulls of varied thickness and curvature.

A further feature is to provide in a trailer attachment for boats a new and improved spring and shock assembly which greatly improves road travel characteristics.

A still further object of this invention is to provide in a trailer attachment for boats a towing hitch which is readily adaptable to a wide variety of prow curvatures.

It is also an object of this invention to provide a new and improved trailer attachment for boats which is readily adaptable to boats of varied widths, lengths and weights.

Another object of the invention is to provide a device of this kind without projections so as to avoid the production of eddy currents when the boat moves in the water.

Another object of the invention is to provide a locked or detachable wheel support for a boat and which may be locked and unlocked from within the boat.

An additional object of this invention is to provide a new and improved trailer attachment for boats which, although durable and dependable, is simple in construction and operation and readily lends itself to the demands of economic manufacture.

Other objects and advantages of this invention will become apparent from a consideration of the following specification taken in conjunction with the accompanying drawings, in which like designators refer to the same or similar parts throughout the several views, and in which:

FIG. 5 is a cross sectional view taken along line 5—5 in FIG. 4.

FIG. 6 is a top plan view showing another form of spring and shock assembly according to my invention.

FIG. 7 is a cross sectional view taken along line 7—7 in FIG. 6.

FIG. 8 is a vertical section, partly broken away, showing still another form of spring and shock assembly according to my invention.

FIG. 9 is a bottom view of the spring and shock assembly shown in FIG. 8 taken along line 9—9 thereof.

FIG. 10 is a fragmentary detail, partly in section, showing a towing hitch arrangement according to my invention.

FIG. 11 is a fragmentary detail of another form of the hull fitting.

FIG. 12 is a cross sectional view taken along line 12—12 in FIG. 11.

FIG. 13 is a fragmentary detail of yet another form of the hull fitting.

Figure 1:
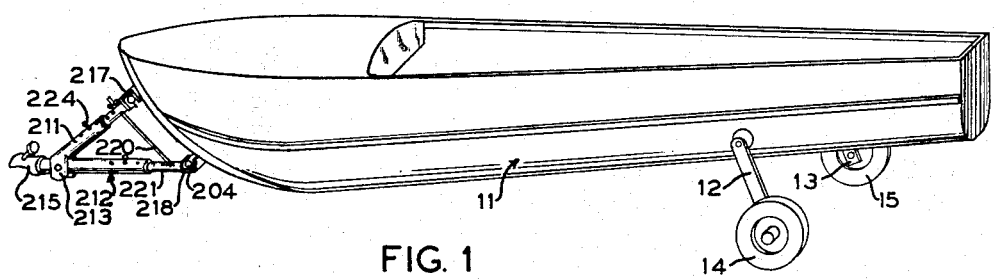
FIG. 1 is a perspective view of a boat showing the wheel support arms and trailer hitch according to my invention.

Referring now particularly to FIG. 1, the numeral 11 designates the hull of a small boat provided with the attachment of my invention which is exteriorly characterized by the detachable arms 12 and 13, resiliently depending from either side of the hull at a small negative caster to rotatably support wheels 14 and 15, respectively, in conventional manner. As shown more clearly in FIG. 2, each wheel support arm is detachably secured to a solid steel axle projecting through the sides of the boat, with the support arm 12 depending from axle 16. The outer end of axle 16 is formed with a flat side 17 so as to preclude relative rotation of the wheel support arm 12 and axle 16, the arrangement being such that the wing headed bolt 18 threads coaxially into axle 16 so as to retain the arm 12 securely thereon. From such construction it will be recognized that the wheel support arms may be readily detached or attached so as to provide for convenient transition between road and water travel.

Figure 3:
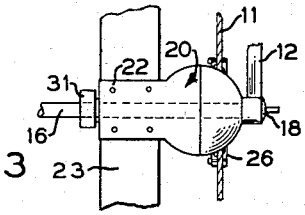
FIG. 3 is a fragmentary detail of a hull fitting according to my invention.

Fitted through the side of the hull for rotatably receiving axle 16 is the semi-spherical universal adapter fitting 20 which is secured to the inner side of the hull by anchor bolts 22 that pass on either side of the axle 16 through the fitting 20, the fitting support block 23, and the hull 11, as more clearly seen in the detail of FIG. 3. Providing for water-tight engagement of the fitting 20 with hull 11 are the inner and outer sealing rings 24 and 25, respectively, maintained in position by circular retainers, 26 and 27, respectively, which are suitably secured to the hull as by bolts 28. The extended base portion of the fitting 20 is provided with a threaded boss 30 to receive thereon the sealing cap 31 which presses the water-tight packing 32 into sealing engagement with axle 16, the latter extending through the head of cap 31 for resilient securement in the spring and shock assembly of my invention.

Figure 2:
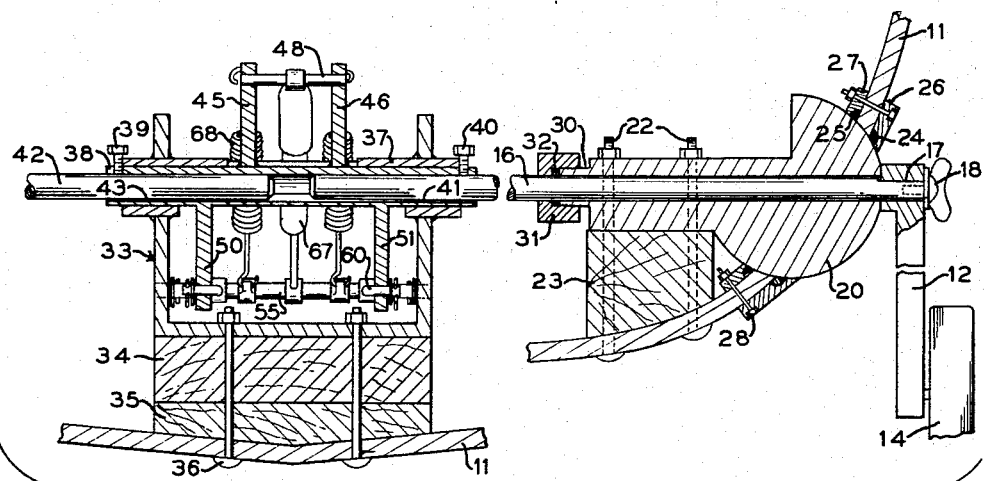
FIG. 2 is a vertical sectional view, partly broken away, showing the interior construction of the spring and shock assembly and hull fitting according to my invention.
Figure 4:
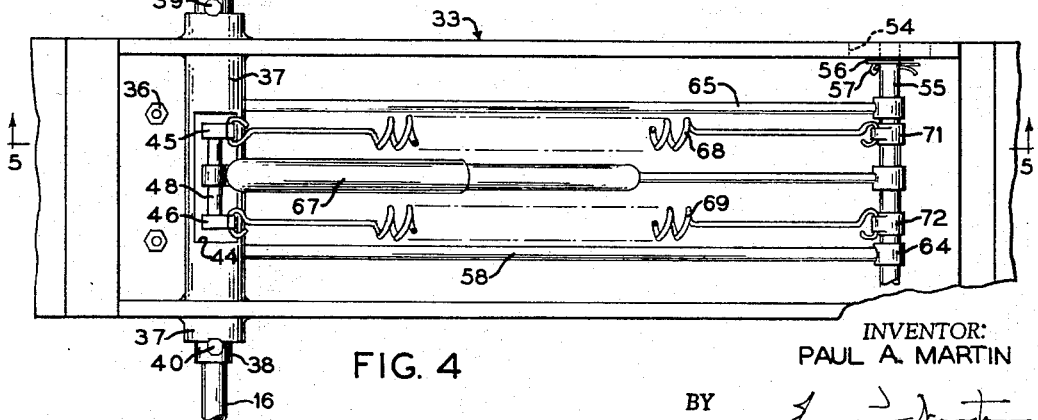
FIG. 4 is a top plan view, partly broken away, showing one form of spring and shock assembly according to my invention.

As shown in the left side of FIG. 2 and in FIGS. 4 and 5, the main structural unit of the spring and shock assembly is the channel-like member 33 mounted on supporting block 34 which rests on the keel 35 of the hull 11. Anchor bolts 36, or other suitable securing means, extend through the hull, keel, and block to maintain channel 33 in position. Cylindrical bearing 37 is transversely positioned through the channel member, being welded or otherwise suitably secured thereto. Fitted for rotation within the bearing 37 is the sleeve 38 which extends a short length beyond each end of the bearing so as to provide for threaded reception of the set screws 39 and 40 that maintain the sleeve centered within the bearing. Axle 16 is received within the sleeve 38, and is keyed thereto, as at 41, for fixed rotation therewith. In like manner, axle 42 from wheel support arm 13 is received within the opposite side of sleeve 38, and is similarly keyed thereto at 43, the arrangement being such that set screws 39 and 40 permit selective positioning of the axles within the sleeve 38 so as to provide for adaptation of the attachment of my invention to boats of varied widths.

The upper side of cylindrical bearing 37 is centrally cut away at 44, exposing sleeve 38 thereunder. Spaced lugs 45 and 46 are welded or otherwise suitably secured to the sleeve 38, passing upwardly through the opening 44 in bearing 37 to secure lug bar 48 therebetween. In like manner, the lower side of bearing 37 is cut away at 49, exposing sleeve 38 to which spaced depending lugs 50 and 51 are welded, the arrangement being such that rotation of sleeve 38 within bearing 37 is limited by abutment of the upper and lower lugs against the periphery of the cut away areas 44 and 49 in bearing 37.

Rearward of bearing 37, the side walls of channel member 33 are formed with opposed elongate apertures, as at 54, in which the ends of floating crossbar 55 are adapted to ride, being retained therein by any suitable means, such as by washer 56 and cotter pin 57 just inside the side walls of the channel member. Extending between depending lug 51 and floating crossbar 55 is a push rod 58 which transfers lug motion to the crossbar. For this purpose, push rod 58 is formed at one end with an elbow 60 for pivotal movement in the apertured lug 51, being secured therein by any suitable means such as the washer and cotter pin arrangement shown. The other end of push rod 58 is pivotally secured to crossbar 55 as by threaded engagement with collar 64 which is fitted for limited rotation on the crossbar 55. In like manner, push rod 65 is secured between depending lug 50 and the floating crossbar 55, the arrangement being such that rotary motion of sleeve 38 with axle 16 is translated into linear motion of the floating crossbar 55.

Secured for limited pivotal movement between floating crossbar 55 and lug bar 48 is the conventional shock absorber 67. On either side of centrally mounted shock absorber 67 are springs 68 and 69, extending between upper lugs 50 and 51, respectively, and crossbar 55. For this purpose, the lugs 50 and 51 are each apertured to receive one return-bent end of their respective springs, and collars 71 and 72 on crossbar 55 are formed with eyelet projections to receive the opposite return-bent ends of the springs, the arrangement being such that in normal operating position the springs 69 and 68 cooperate with shock absorber 67 to provide a spring-loaded shock assembly for rotational forces imparted to the axles 16 and 42.

Operation of the foregoing construction can more readily be seen by consideration of FIGS. 1 and 5. Limited deviation in road level and small road shocks are absorbed independently by the axles 16 and 42 through torsional action thereon between sleeve 38 and the hull fittings 20. Large road deviations and road shocks, however, are transmitted by the axles to sleeve 38 which effects rotation of the upper and lower lugs as heretofore described. Such rotation causes the ends of each spring and the shock absorber to move in opposite directions so as to provide for double action per degree of lug rotation. The particular advantage of this double action arrangement is that shearing force at the joinder of the lugs and the sleeve is halved for the same rotational force of the axles. It should also be noted that the suspension arrangement is such as to accommodate a wide variation in loads, as would be occasioned by removal or securement of an outboard motor to the boat, without loss of optimum roadability characteristics.

That form of the invention shown in FIGS. 6 and 7 is intended for heavier duty applications, but embodies many of the same principles utilized in FIGS. 2, 4 and 5. The channel member 70 therein shown is provided with cylindrical bearings 71 and 72 coaxially extending through channel side walls 73 and 74 respectively, being welded or otherwise suitably secured thereto. Fitted for rotation within the bearings 71 and 72 is cylindrical sleeve 75, extending a short length beyond each so as to provide for threaded reception of the set screws 76 and 77 which maintain the sleeve centered within the bearings. Axles 78 and 79 are received within the sleeve 75, being keyed thereto at 81 for fixed rotation therewith, the arrangement being such that set screws 76 and 77 also permit selective positioning of the axles within the sleeve. As shown more clearly in FIG. 7, the upper lug 83 and lower lug 84 are each formed with flange-like base portions that are suitably apertured so as to be clamped together by bolts 85 and 86, the arrangement being such that the bolts pass through grooves in sleeve 75 so as to be, in effect, keyed thereto. In like manner, a second set of upper and lower lugs are secured to the sleeve, with lug bar 88 fitted between the upper lugs and lug bar 89 fitted between the lower lugs.

In the forward end of channel 70, the side walls 73 and 74 are apertured at 91 and 92, respectively, to form a track for the ends of the floating crossbar 93. Extending between lower lug bar 89 and floating crossbar 93 is the pull rod 95 having collars, as at 96, threaded to either end thereof for limited pivotal movement on its supporting bars. In like manner, a second pull bar 98 is provided between the lower lug bar 89 and crossbar 93, the arrangement being such that pull rod 95 is adjacent side wall 73, and pull rod 98 is adjacent side wall 74. Secured between upper lug bar 88 and floating crossbar 93 are spring units 100 and 101, each characterized by a cylinder 103 enclosing a compressible coil spring 104. Adapted for slidable movement in cylinder 103 is piston 105, the piston rod 106 thereof being threaded into collar 108 for rotatable securement to upper lug bar 88. The forward end of cylinder 103 is provided with air passage 107 and an apertured ear 108' for pivotal securement to floating crossbar 93. Elongate collars, as at 109 and 110, maintain proper spacing of the spring units, with central collar 110 being provided with set screw 111 to hold crossbar 93 properly centered between channel side walls 73 and 74.

In the rearward end of channel 70, side walls 73 and 74 are formed with aligned apertures for reception of the transverse rod 115 which is retained therein by a washer and cotter pin arrangement, as at 116, at each end of the rod just inside the channel side walls. Conventional shock absorber 118 extends between upper lug bar 88 and transverse rod 115, being rotatably secured thereto in any suitable manner, such as by the collars 120 and 121 shown. Extending between lower lug bar 89 and transverse rod 115 is spring unit 125 having a cylinder 126 which encloses a compressible coil spring 127. Adapted for slidable movement in cylinder 126 is the piston 128, the piston rod 130 thereof being threaded into collar 131 for rotatable securement to rod 115. The forward end of cylinder 126 is provided with an air passage 132, and terminates in an extended rod 133 which is suitably secured to lower lug bar 89. From the foregoing construction it can be seen that the suspension action is similar to that form of the invention shown in FIGS. 2, 4 and 5, with the push rods 95 and 98 providing double action on spring units 100 and 101, but with only single action on spring unit 125 and shock absorber 118.

Referring now particularly to FIGS. 8 and 9, the embodiment of the invention therein shown includes a channel member 135 formed with confronting semi-circular cut out portions, as at 136, in the side walls thereof.

Considering channel side wall 137, it being understood that the arrangement for side wall 138 is identical, the lower half 140 of bearing 141 is preferably welded to the periphery of cut out 136, with the upper half 142 of bearing 141 being secured to lower half 140 in conventional manner, as by bolts 143. Cut out 136 is formed with recesses 145 to provide for the heads of bolts 143. Adapted for rotatable support in bearing 141 and aligned bearing 146 is sleeve 148 having spaced shoulders 150 and 151 to maintain the sleeve centered in the bearings. Axles 152 and 153 are received within sleeve 148, being keyed thereto, as at 154, for fixed rotation therewith, the arrangement being such that set screws 155 and 156 provide for selective positioning of the axles within the sleeve. Welded to sleeve 148 are the spaced depending lugs 157 and 158, having lug bar 160 fitted therebetween.

Preferably welded to the floor of channel 135 at the forward end thereof are spaced brackets 162 and 163, being formed with aligned apertures, along with side walls 137 and 138, for the reception of transverse rod 165. Supported between rod 165 and lug bar 160 are a pair of spring units 167 and 168, each characterized by an elongate cylinder enclosing a pair of coaxially positioned coil springs 172 and 173. The forward end of cylinder 170 is provided with an apertured ear 176 for support of the cylinder on transverse rod 165, being secured thereto between bracket 162 and washer 178 which is retained in position by cotter pin 179. Adapted for slidable movement within cylinder 170 and separating shorter forward spring 172 from longer rearward spring 173 is the spring actuating disk 180 which is secured to the end of rod 181, being retained against the terminal shoulder thereof by nut 183. Centrally apertured guide plug 184 is threaded into the rearward end of cylinder 170. Rod 181 passes through guide 184, terminating in enlarged eyelet 185 for rotatable securement to lug bar 160.

The rearward end of channel member 135 is provided with upstanding brackets 187 and 188 which are preferably welded to the floor of the channel member. Extending between lug bar 169 and bracket 187 is the spring unit 190, being identical in construction to spring units 167 and 168 except that the positions of shorter spring 191 and longer spring 192 are reversed. Actuator rod 193 of spring unit 290 is secured to lug bar 160 adjacent actuator rod 181, being retained against the lug 157 by a washer and cotter pin arrangement as at 195. At the rearward end of spring unit 190, the apertured ear 196 thereof is secured to the transverse rod 198, the arrangement being the same as for the support of spring unit 167 on rod 165. Adjacent spring unit 190 and supported in like manner between lug bar 160 and transverse rod 198 is the conventional shock absorber 200. From such construction it can be seen that upon loading of the spring and shock assembly, as would be occasioned by road travel of the boat to which the invention is attached, the spring actuator disk in each spring cylinder will assume a more central position resulting from rotation of lugs 157 and 158 with axles 152 and 153. It should be recognized, however, that the characteristics of shock absorber 200 will remain substantially unaffected by variations in the static load position of the spring and shock assembly.

For a better understanding of the construction of the tow hitch of my invention, particular reference is made to FIGS. 1 and 10 wherein it can be seen that the central frame member 201 of the prow is provided with a pair of vertically spaced T-bolts 203 and 204, the arrangement being such that the bolt crossheads, as at 206, extend exteriorly of frame member 201, while the bolt shanks, as at 207, pass therethrough for securement as by nut 208 inside the hull.

Adapted for selective engagement with the hull mounted T-bolts is a detachable tow bar having upper and lower tubular arms 211 and 212, respectively, the arrangement being such that the upper arm 211 is angularly secured to substantially horizontal lower arm 212 at 213 for limited pivotal movement with respect thereto. The forward end of lower arm 212 is fitted with a conventional trailer coupling socket 215. The rearward extremity of upper arm 211 is provided with downwardly opening clamp member 217 which is adapted for engagement with the upper T-bolt 203 secured to the boat prow. In like manner, the rearward end of lower arm 212 is fitted with upwardly opening clamp member 218 which is adapted for engagement with lower T-bolt 204. Maintaining the upper and lower arms in clamped position against the T-bolts is securing rod 220 which is pivotally mounted on the lower arm at 221 and passes through an aperture in the upper arm for selective securement thereabove as by wing nut 222.

To provide for adaptation of the hitch to boat prows of varied curvature, both the lower arm 212 and the upper arm 211 are formed with adjustable telescoping sections, the arrangement being such that the related sections of each arm are adapted to be secured by a transverse pin as at 224.

From the foregoing, the manner of utilizing the trailer attachment of my invention should be readily apparent. By merely removing or applying the wing bolts 18, the wheel support arms 12 and 13 may be easily removed or attached to the hull for selectively conditioning the boat for travel in water or on land. Similarly, the towing hitch may be easily detached or applied by proper manipulation of wing nut 222 so as to either tighten or loosen the clamping arms 211 and 212.

In the practice of the invention, it is of course recognized that the channel members may be formed with cut out areas so as to reduce weight and cost, and that grease fittings may be provided in the hull fittings and spring and shock assembly as is well understood by those skilled in the art. It is also recognized that the hull fitting 20 may receive a wide variety of expressions other than the embodiment shown.

In yet another form of the invention as shown in FIGS. 11 and 12 the boat hull 11 is provided with bearing members 230 each having a spheroid outer surface 231, as has the member 20 of FIG. 2, passing through the hull. The bearing member 230 is water-tight with respect to the hull as by the seals 24 and 25 and is similarly mounted as in FIG. 2 on the interior of the boat by the block 23 by screws or bolts 22'.

The bearing member 230 is of reduced internal diameter as at 232 at the inner portion 233 which is mounted on the block 23, and through such portion passes therethrough the outer end portion 234 of a shaft 235 generally comparable with axles 16, 42, 78 and 79. However, the shaft 235 does not project outwardly through the bearing member 230 as a whole, but terminates in the outer portion 236 of increased internal diameter as at 237. The outer part 236 carries rotatably therein a stub shaft 238, to which is secured fast, as by welding at 239, a wheel support arm 12' having the general function of arm 12 in FIG. 1. The shafts 235 and 238 are telescoped for longitudinal separation and coaxial rotation together by external and internal mating fluting 240 and 241, respectively, of the shaft end 232 and a bore 242 in stub shaft 238.

The stub shaft 238 is retained in the bearing member 230 and on the shaft 235 by retaining means, generally designated 243, on the member 230 and acting in a peripheral groove 244 in the stub shaft.

The retaining means 243 includes a screw plug 245 having an axial bore 246 and counterbore 247 and which is threadedly mounted on the bearing member at the normal position of the groove 244.

In the bore 246 is slidably disposed the round stem 248 of a yoke member 249 having an arcuate groove-engaging part 250 substantially swiveled at the mid-part 251 thereof on the stem. In locking position, the arcuate part is received in the groove 244 to embrace a small portion of the stub shaft and engage the side walls within the groove and is biased to such a position by a helical spring about the stem compressed within the counterbore and against the arcuate part.

When the arcuate part 250 is withdrawn from the groove 244 as by drawing the stem outwardly by a ring handle 252, with the part 250 entering a recess 253 in the member 230, the stub shaft 238 may then be drawn from the bearing member for complete detachment of the castor from the boat.

In practice, the swiveling at the arcuate part may be merely loose threading and in such construction it is desirable to provide the stem 248 with a radially projecting pin 254 to lie in an outwardly open radial slot 255 when the retaining means is in locking position, to prevent vibration from loosening the stem. When the means 243 is to be maintained in unlocking position, the stem may be given a turn (180° as shown in the drawing) for the pin to be held in a much shallower slot at 256, and so hold the retaining means from engagement in the groove 244.

At times, as when the attachment is used with very heavy boats or loads therein, and means such as set screws 39 and 40 (FIG. 4) are not to be tampered with, it is highly desirable that the wheel arm 12' always be fitted on the shaft 235 in the same angular relationship to the lever arms 45 (FIG. 5) or 157 (FIG. 8) for example. This condition can be easily insured by the omission of fluting from the bore of the stub shaft and shaft 235 at a small but readily recognizable zone such as at 257 (FIG. 12).

While one of the advantages of my invention thus far described is that it may be used on boats of various shapes, the invention may be used when the side of the boat is flat and no projection extends from the side to cause frictional drag and eddy currents.

Such a form of the invention is particularly shown in FIG. 13 wherein the modified bearing member 260 is provided at its outer end 261 with a flange 262 shown inclined to axis of the bearing member to conform to the shape of the hull 11. The flange 262 is secured watertight to the boat by the provision of a peripheral rabbet groove 263 in the flange for receiving marginal portions 264 about the hole 265 through the hull 11 of the boat. The flange is secured tight and fast to the hull by means such as a ring 266 and bolts 267 at the marginal portions of the hole.

In operation, the detaining means 243 is manipulated so that it may have no engagement with the stub shaft 238 during the connecting or disconnecting of the latter with respect to the shaft 235. After connection for use, the retaining means is allowed to remain in the position as shown.

From the foregoing it should be apparent that I have provided a new and improved trailer attachment for boats which is well adapted to fulfill the aforesaid objects of the invention. Moreover, whereas the invention has been described in particularity with respect to preferred embodiments which give satisfactory results, it will be understood by those skilled in the art to which the invention most nearly appertains that other embodiments and modifications thereof may be resorted to without departing from the spirit or scope of the invention as defined by the appended claims.

I claim:

1. In a device of the character described, the combination with a boat, of a pair of axles, means to coaxially support said axles each projecting through one side of said boat, a pair of wheel support arms each detachably secured to one of said axles exteriorly of said boat, and means for resiliently securing said axles for limited rotation including a shock absorber and a sleeve member securing said axles for fixed rotation therewith, and means for limiting rotation of said sleeve member.

2. In a device of the character described, the combination with a boat, of a pair of axles, means to coaxially support said axles each projecting through one side of said boat, a pair of wheel support arms each detachably secured to one of said axles exteriorly of said boat, and means for resiliently securing said axles for limited rotation including a shock absorber and a sleeve member securing said axles for fixed rotation therewith, and means centrally mounted within said boat for resiliently restraining movement of said sleeve member.

3. In a device of the character described, the combination with a boat hull, of a pair of axles, universal adapter means for coaxially supporting each of said axles through said hull, a pair of wheel support arms each detachably secured to one of said axles exteriorly of said hull, and means for resiliently securing said axles for limited rotation, a sleeve member securing said axles for rotation therewith, lug means secured to said sleeve member, and resilient means connected to said lug means for restraining movement thereof.

4. In a device of the character described, the combination with a boat hull, of a pair of axles, universal adapter means for coaxially supporting each of said axles through said hull, a pair of wheel support arms each detachably secured to one of said axles exteriorly of said hull, a sleeve member secured to said axles for rotation therewith, means for rotatably supporting said sleeve member centrally within said boat hull, first and second oppositely projecting lug members secured to said sleeve member for rotation therewith, a spring connected at one end to said first lug member, and means responsive to movement of said second lug member for effecting movement of the other end of said spring.

5. In a device of the character described, the combination with a boat hull, of a pair of axles, universal adapter means for coaxially supporting each of said axles through said hull, a pair of wheel support arms each detachably secured to one of said axles exteriorly of said hull, means centrally mounted within said hull for resiliently restraining said axles from rotation, said universal adapter means including a hull fitting having a base portion and a spherical end portion, said base and end portions defining a bore therethrough to rotatably receive an axle, and means for providing a seal between said base portion and said axle.

6. In a device of the character described, the combination with a pair of axles, of a sleeve member adapted to secure said axles for rotation therewith, means for rotatably supporting said sleeve member, first and second oppositely projecting lug members secured to said sleeve member for rotation therewith, a spring connected at one end to said first lug member, and means responsive to movement of said second lug member for effecting movement of the other end of said spring.

7. In a boat having a hull, a pair of axles transverse to the boat, a sleeve member for securing the axles together, a radially projecting lug on the sleeve member and responsively turnable to movement of the axles, resilient means tending to resist turning of the lug, a shock absorber to damp turning of said lug, bearing members on opposite sides of the boat passing through the hull and respectively carrying said axles, wheel arms outside the boat and carrying means for rotatably engaging the bearing members and securing the arms in fixed relationship relative to the respective axles.

8. In a boat having a hull, a pair of substantially aligned axles transverse to the boat, a connector for the axles and provided with a radial member constrained to turn with the axles, resilient means for tending to resist turning of the radial member and axles, bearing members on the hull for mounting the axles for rotation, said axles having outer end portions each provided with axial splines, a pair of wheel-carrying arm members each having a socket recess at one end portion of the arm member for receiving slidably in the direction of the axes the outer end portions of the respective axles, and means for holding the arm members from sliding off the axles.

9. In combination with a boat having a hull, an axle transverse to the boat and having a flutedly grooved end portion, a bearing member through the hull having an inner end portion of reduced internal diameter bearingly receiving the axle for rotation, a stub shaft in the outer end portion of the bearing and carrying an arm outside the boat, the shaft being provided with a recess bore provided with internal fluting to slidably mate with the end portion of the axle, and provided with an outer peripheral groove, and retaining means mounted on the bearing for selectively entering the peripheral groove and holding the stub shaft in the bearing.

10. A combination as claimed in claim 9, said outer end portion of the bearing having an end flange substantially flush with the hull to prevent eddy currents, and means to prevent said axle from projecting outwardly past the flange.

No references cited.

MILTON BUCHLER, *Primary Examiner.*

T. M. BLIX, *Assistant Examiner.*